C. E. BAGLEY.
TRACTOR ATTACHMENT FOR AUTOMOBILE WHEELS.
APPLICATION FILED MAY 12, 1917.
1,251,617.
Patented Jan. 1, 1918.
2 SHEETS—SHEET 1.
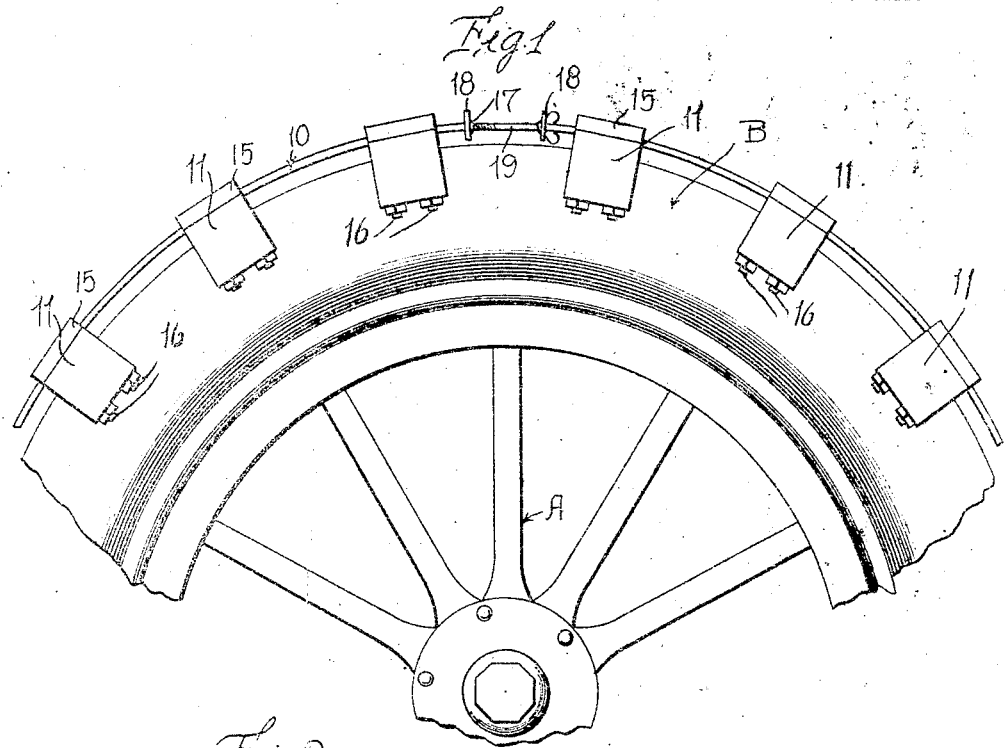
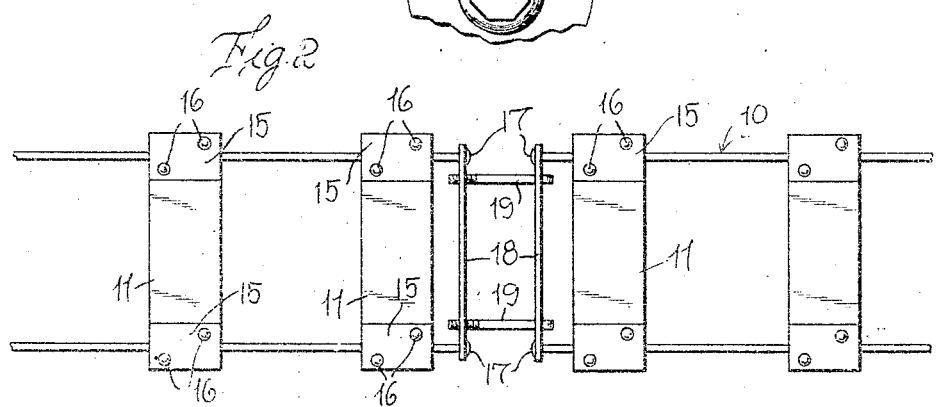
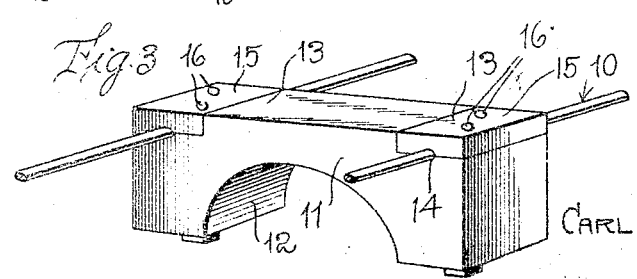
Inventor
CARL E. BAGLEY
By Watson E. Coleman
Attorney

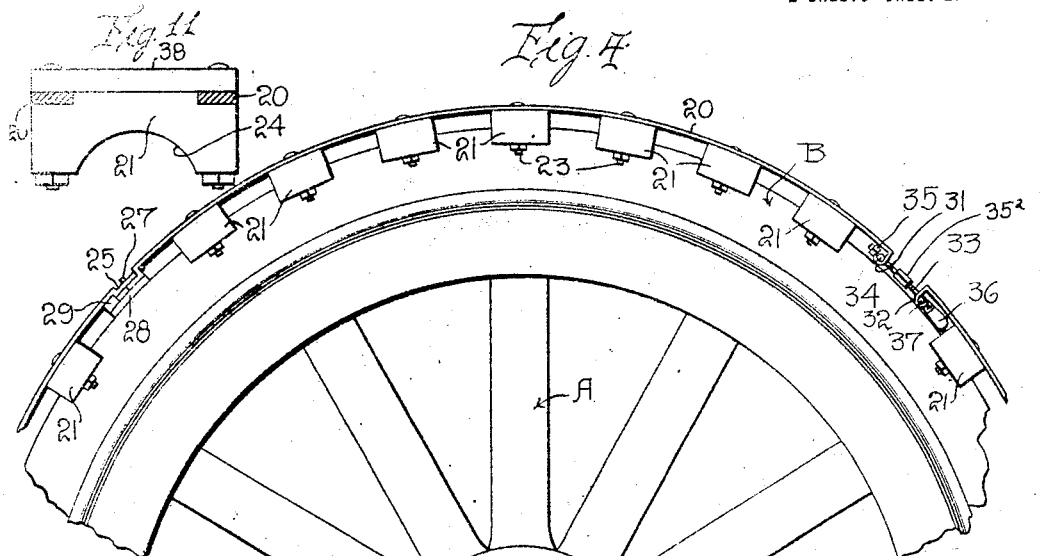
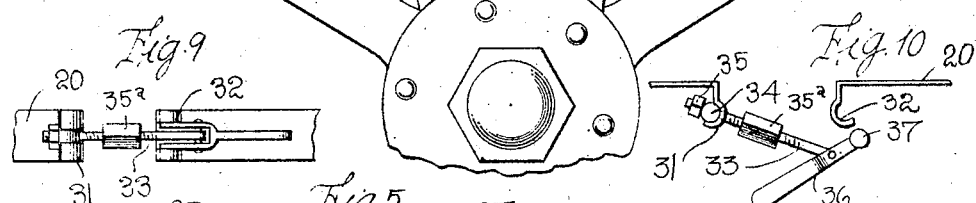
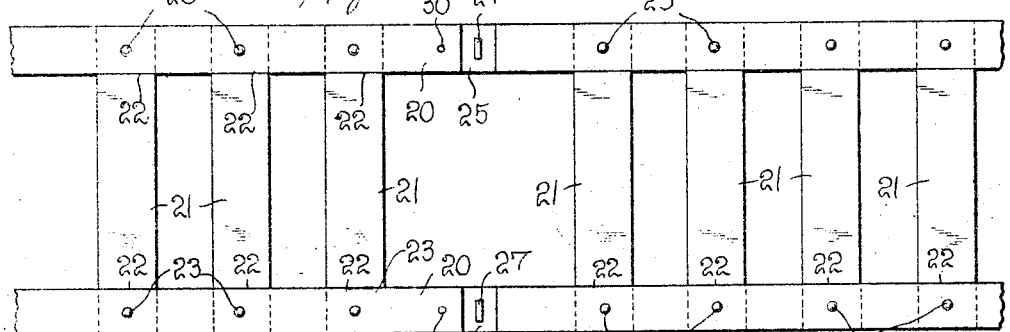
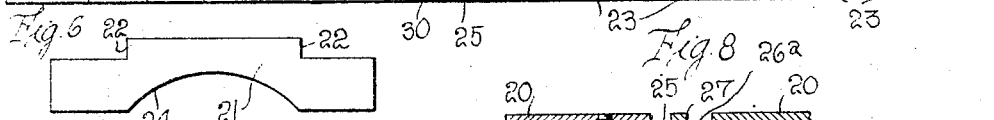
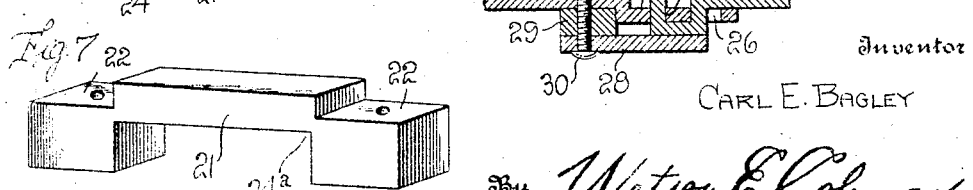

UNITED STATES PATENT OFFICE.

CARL E. BAGLEY, OF WELCOME, MINNESOTA.

TRACTOR ATTACHMENT FOR AUTOMOBILE-WHEELS.

1,251,617.  Specification of Letters Patent.  Patented Jan. 1, 1918.

Application filed May 12, 1917. Serial No. 168,247.

*To all whom it may concern:*

Be it known that I, CARL E. BAGLEY, a citizen of the United States, residing at Welcome, in the county of Martin and State of Minnesota, have invented certain new and useful Improvements in Tractor Attachments for Automobile-Wheels, of which the following as a specification, reference being had to the accompanying drawings.

This invention relates to traction devices adapted to be disposed upon automobile wheels or the tires thereof for the purpose of increasing the tractive effect of the wheels, and particularly to detachable devices which may be used with ordinary resilient tires where the machine is obliged to work in mud or where the tractive power of the machine is desired to be increased.

The general object of my invention is the provision of a very simple but thoroughly effective means for this purpose, comprising a plurality of annuli and cross blocks mounted upon the annuli and formed to fit over the ordinary cushion tire and project outward beyond the surface of the tire so as to increase the tractive power of the tire.

A further object of the invention is to provide a construction of this character which may be quickly applied or removed from the tire and which is adapted to be engaged with tires of different sizes within limits.

And still another object is to provide a construction of this character formed in sections having interlocking engagement with each other so that the traction attachment may be removed from the tire and folded up when not in use.

Other objects will appear in the course of the following description.

My invention is illustrated in the accompanying drawings, wherein:—

Figure 1 is a side elevation of a portion of an automobile wheel showing one form of my attachment applied thereto;

Fig. 2 is a top plan view of the attachment shown in Fig. 1;

Fig. 3 is a perspective view of one of the blocks and the connecting annuli;

Fig. 4 is a side elevation of a portion of an automobile wheel showing another form of attachment applied thereto;

Fig. 5 is a top plan view of the form of attachment illustrated in Fig. 4;

Figs. 6 and 7 are views of two forms of blocks adapted to be used with this attachment.

Fig. 8 is a longitudinal sectional view through the joint between two sections of the annuli;

Fig. 9 is a top plan view of the means whereby each annuli is drawn tight upon the wheel rim;

Fig. 10 is a side elevation of the construction illustrated in Fig. 9, but showing the ends of the annulus disconnected;

Fig. 11 is a transverse sectional view showing a supplementary block applied to the supplemental attachment.

Referring to Figs. 1, 2 and 3 which show the simplest form of my invention, A designates an automobile wheel of any suitable form and B the usual tire thereon. My improved attachment comprises the two annuli 10 which are illustrated as composed of relatively flexible rods, upon which are mounted transversely extending blocks 11. One of these blocks is illustrated in Fig. 3 and it will be seen that each block is cut away on its under face as at 12 to fit the transverse curvature of the tire B and that each block is recessed on its lateral corners as at 13, the bottom of this recess being formed with a groove 14 to receive the corresponding annulus 10. This annulus is held in place upon the block by a plate 15, which fits the recess 13 and whose under face is provided with a groove corresponding to the groove 14. Screws, bolts, or other like fastening devices 16 extend downward through the plate 15 and into the block 11 and are disposed on each side of the corresponding annulus 10. The clamping plates 15 fit the annulus 10 so tightly that the block 11 is prevented from any longitudinal shifting movement upon the annulus. At the same time this construction permits of the blocks 11 being readily removed and replaced in case any of the blocks become too worn or are broken. These blocks 11 will preferably be of wood, though I do not wish to be limited to this.

The ends of the annuli are connected to each other in the following manner. The ends of the annuli are headed as at 17 and extending transversely and engaged with these headed ends are the cross bars 18, which are connected to each other by winged bolts 19, or any other suitable form of bolt. It will be seen, of course, that the cross blocks 11 project out beyond the tire and beyond the annuli 10 and that the annuli 10 do not come in contact with the surface of the ground.

The device above described is intended as a traction attachment designed to be applied to the automobile wheel, where the machine is working in mud. In Figs. 4 and 5, I show another form of this device in which the laterally disposed annuli are formed of flat strips 20. The transversely extending blocks 21 are recessed upon their outer faces to receive these strips, as at 22, and the blocks are held to the strips by bolts 23. The inner face of the block is cut away as at 24, so as to fit the tire. In Fig. 7, I show a slightly different form of block in which the cut-away portion 24$^a$ is rectangular instead of being rounded, this form of block being particularly adapted to certain tractors not using pneumatic tires but having relatively flat and thick rubber tires.

Preferably the annuli 20 will be formed in sections, as illustrated in Fig. 4, these sections being connected by a quick detachable joint, as illustrated in detail in Fig. 8. Thus, for instance, one of the sections of an annulus will be downwardly deflected and then forwardly extended to form a tongue 25, which is provided with transverse slots 26 and 26$^a$. The adjacent end of the other section of the annulus is narrow in width and is bent to form an upwardly extending tongue 27, which extends upward through the slot 26$^a$ in the manner illustrated in Fig. 8, this joint being held from detachment by a locking plate or keeper 28, which is pivotally mounted upon one section of the annulus, as, for instance, rearward of the deflected portion 25 and preferably it is mounted upon a spacing member or washer 29, held in place by a bolt or screw 30. It is obvious now that this locking plate may be rotated out of or into a position beneath the hook shaped tongue 27 and that when in the position shown in Fig. 8, it will lock the two sections of the annulus together from detachment.

While I do not wish to be limited to any particular manner of drawing the annuli 20 toward each other, so as to clamp them tightly upon a wheel, or any particular manner of detachably connecting the annuli to each other so that they may be readily removed from the wheel, I have illustrated for this purpose each of the annuli 20 as being formed with a bead 31, this bead being slotted. The opposite end of the annulus is formed with laterally disposed hooks 32 spaced from each other, and the tightening means comprises a rod 33 formed at one end with a head 34 engaging within the slotted bead 31 and provided with a nut 35, and a turn buckle 35$^a$ whereby the rod 33 may be tightened upon the head 34. The opposite end of this connecting rod 33 is engaged in the bifurcated end of a lever 36, the fork ends of this lever being provided with laterally extending trunnions 37' engageable with the hooks or beads 32. It will be obvious from Fig. 9 that when the lever 36 is turned to the position shown in Fig. 4, that the annulus will be drawn tight around the wheel and that when the lever is turned to the position shown in Fig. 10, the annulus is loosened or unclamped from the wheel and the lever may be readily removed to permit the attachment to be removed. Inasmuch as each annulus is jointed, the sections may be taken apart and the sections of the attachment disposed against each other, so that the attachment may be packed in a small compass for easy carriage.

These attachments, as heretofore described, are particularly useful in connection with automobile trucks ordinarily not used for heavy work but which may be used as tractors for pulling farm wagons or for heavy hauling over mud or soft ground. Preferably the wooden blocks 11 and 21 will be treated chemically so that they will not rot or otherwise deteriorate and these attachments are designed to be used on cars or trucks using regular tires and tire casings and where a greater tractive force is needed than can be secured by the use of mud chains.

Where very heavy hauling is to be done through deep mud, I preferably attach extra blocks 38 to the transverse blocks 21 as illustrated in Fig. 11, these extra blocks 38 being bolted to the blocks 21 by means of the bolts 23 passing entirely through the block 38, the annulus 20 and through the block 21. This improved mud attachment is very light, portable, and I have found it very effective in action. It may be applied quickly, and as quickly removed, and it may be cheaply constructed.

Having described my invention, what I claim is:—

1. A tread attachment for automobile wheels including an annulus formed in sections, each section at one end having a tongue provided with a slot and at the opposite end having an outwardly extending hook adapted to engage in said slot, and a pivoted locking member mounted upon the slotted section and shiftable into position beneath the hooked shape end of an adjacent section to thereby hold the sections in engagement with each other.

2. A tread attachment for automobile wheels including an annulus formed in a plurality of sections, each section at one end having a depressed tongue formed with a transversely extending slot, the opposite end of the section having a hook depressed below the plane of the tongue and formed with a bill extending upward through said slot, a block mounted upon the tongue end of the first named section and engaging against a shoulder formed by the depression of the tongue, the opposite end of the section being depressed, then longitudinally extended and then outwardly extended to form a hook, the bill of which is adapted to extend through the slot in the tongue, and a locking member pivotally mounted upon the block and when turned against the under face of the hook shaped end of an adjacent section holding the hook-shaped end in engagement with the tongue.

In testimony whereof I hereunto affix my signature in the presence of two witnesses.

CARL E. BAGLEY.

Witnesses:
E. N. HALKNEY,
L. B. BAGLEY.